May 4, 1926. 1,583,623
H. S. STERN
EXTENSIBLE CARRIER FOR PLEASURE CARS
Filed Jan. 13, 1925
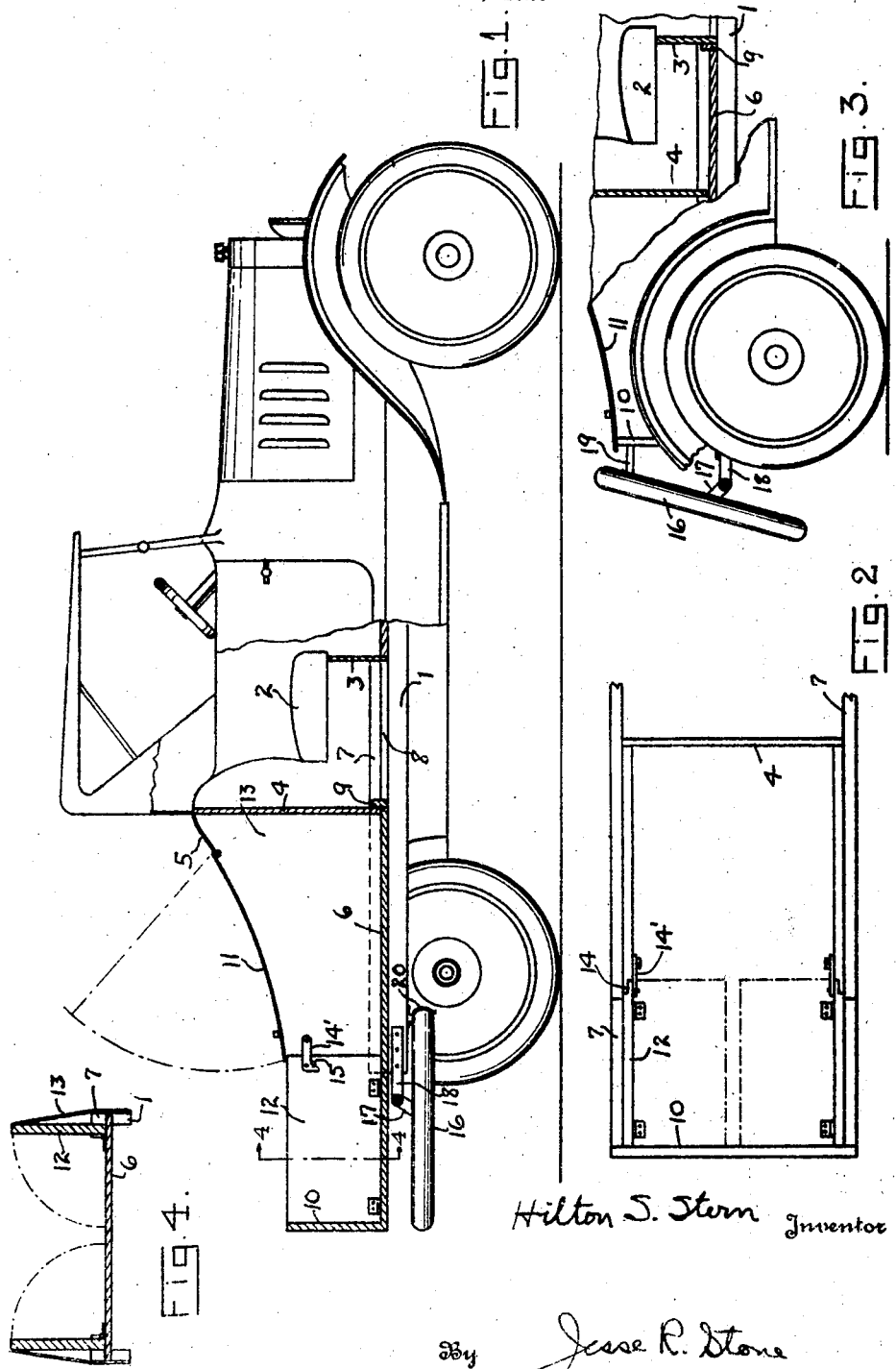

Patented May 4, 1926.

1,583,623

UNITED STATES PATENT OFFICE.

HILTON S. STERN, OF HOUSTON, TEXAS.

EXTENSIBLE CARRIER FOR PLEASURE CARS.

Application filed January 13, 1925. Serial No. 2,210.

*To all whom it may concern:*

Be it known that I, HILTON S. STERN, a citizen of the United States, residing at 1117 Main Street, Houston, Texas, have invented a certain new and useful Improvement in Extensible Carriers for Pleasure Cars, of which the following is a specification.

My invention relates to a carrier for freight forming an attachment to pleasure cars of ordinary construction.

It is a frequent occurrence in the use of pleasure cars that loads in addition to the passengers must be carried. Baggage or goods purchased or sold must be transported either with or without the usual load of passengers.

It is an object of the invention to provide a vehicle body for pleasure motor cars which is extensible to form a load receptacle for freight and the like.

It is desired to provide a combined pleasure car and truck which is capable of being closed for pleasure purposes, or extended to provide a container for freight. It is also contemplated that the tire rack at the rear of the car be hinged to drop down out of the way when the car body is extended. Other objects and advantages of the construction will become apparent from the detailed description which follows.

Referring to the drawing, Fig. 1 is a side view partly in elevation and partly in vertical section showing an automobile embodying my invention. Fig. 2 is a broken top plan view of the carrier, Fig. 3 is a broken side view and Fig. 4 is a transverse section on the plane 4—4 of Fig. 1. Like numerals of reference are applied to like parts in all the views.

In the drawing, I have shown an automobile of the roadster type ordinarily used for pleasure. The body of the car is supported upon a frame comprising two longitudinal side members 1 as is usual in the construction of the chassis of such cars, extending the full length of the body. The driver's seat 2 has a vertical front supporting member 3 and a rear upright wall 4. Behind the seat the body of the car is curved downwardly at 5 to enclose the space at the rear of the seat.

The floor 6 beneath the seat and the enclosure 5 is mounted to slide forwardly and rearwardly. Said floor is supported upon the frame members 1 at each side. Above the said member 1, on each side of the car, is a longitudinal bar 7 spaced from the frame 1 to provide a guide or track 8 in which the floor is slidably supported. An upwardly extending flange 9 upon the forward end of the floor serves as a stop to limit the rearward movement of the floor.

The floor has, at its rear end, an upwardly extending end wall 10 which, when the extension is closed, serves to fit against the end of the door 11, forming a part of the car body 5. Adjacent to the end wall 10, at each side, are hinged sides 12 which drop downwardly on to the floor as shown in dotted lines in Fig. 2. The side members 12 overlap the sides 13 of the body at the inner ends of said doors, as shown at 14 in Fig. 2; and latches 14', or equivalent means on the side 13, may engage pins 15 on the sides 12 to hold them in raised position.

The tire rack supporting the tire 16 has thereon a bracket 17 hinged to the ends of plates 18 which are secured to the frame members 1 and extend rearwardly. When the tire rack is in raised position, it is secured to the rod 19 extending from the sides 13. But when it is dropped down to extend the body, its lower end is snapped behind a spring 20 on the car frame to hold it in its lowered position.

In the use of my invention, the extension body formed by the floor 6, and its sides 12 thereon folded down, is in its forward position shown in Fig. 3 with the flange 9 against the seat board 3 and the end wall 10 under the rear of the cover wall 11. In this position the extension will not be noticeable and with the tire rack raised the car will have the appearance of the ordinary roadster. When the extension is in use it is drawn back to the position shown in Fig. 1, the sides 12 raised and latched, the tire rack being secured out of the way. The cover wall 11 is hinged and may be raised as high as desired and the rear end will thus have the appearance of a truck body and be capable of carrying heavy loads. It will be noted that the floor, which carries the load is firmly supported between firm supporting members 1 and 7 and is capable of supporting ordinary loads without danger of breaking.

While I have shown the attachment employed upon a roadster type of body, it is plainly adapted for use on all types of pleasure cars and may be changed in structure to accommodate the same to the type of car and the purpose to be served without departing from the spirit of the invention.

Having thus described my invention, what I claim as new and desire to protect by Letters Patent is:

1. A convertible pleasure car and truck comprising a car frame and a body thereon in combination with a bar spaced above said frame, parallel therewith to form a guide, a supporting member slidable longitudinally in said guide, a rear wall thereon and side walls adjacent the rear end of said member adapted to be folded out of the way when said member is in forward position.

2. In a convertible car and truck, a frame having two vertically spaced side frame members at each side forming a guide, a floor extension slidable in said guide, an end wall fixed on said floor extension, side walls on said extension adapted to fold inwardly on to said floor, means to hold said side walls erect when said floor is extended, and means at the forward end of said floor extension to limit its movement in both directions.

In testimony whereof I hereunto affix my signature this 10th day of January, A. D. 1925.

HILTON S. STERN.